United States Patent
Olsen

Patent Number: 5,949,423
Date of Patent: Sep. 7, 1999

[54] Z BUFFER WITH DEGREE OF VISIBILITY TEST

[75] Inventor: Daniel M. Olsen, Ft. Collins, Colo.

[73] Assignee: Hewlett Packard Company, Palo Alto, Calif.

[21] Appl. No.: 08/941,768

[22] Filed: Sep. 30, 1997

[51] Int. Cl.[6] .................................................. G06T 15/40
[52] U.S. Cl. ........................................ 345/422; 345/428
[58] Field of Search .................................... 345/422, 421, 345/428

[56] References Cited

U.S. PATENT DOCUMENTS 5,268,995   12/1993   Diefendoff ............................... 345/422
5,734,806    3/1998   Narayaswami .......................... 345/422

*Primary Examiner*—Mark R. Powell
*Assistant Examiner*—Huedung X. Cao
*Attorney, Agent, or Firm*—Edward L. Miller

[57] ABSTRACT

A solution to the problem of determining the degree of visibility for a bounding volume is to first sort the bounding volumes into an order in which they can be tested, after which they are rendered as if they were polygons in their own right. Prior to the testing of the next bounding volume a Bounding Volume Visibility (BVV) mode is enabled. This temporarily suspends write operations to the frame buffer and it resets a TOTAL PIXEL COUNTER and a VISIBLE PIXEL COUNTER. Then the polygon sides of the bounding volume are rendered, with each and every pixel of those polygons being checked for depth, as would be the pixels for "real" polygons. Each such pixel rendered causes an increment of the TOTAL PIXEL COUNTER, while each such pixel that meets the depth criteria in use causes an increment of the VISIBLE PIXEL COUNTER. The BVV mode is subsequently turned off, and the values of the two counters inspected. The inspecting entity may be software associated with the graphics application. It can decide whether or not to render the image polygons within the bounding volume just tested. The values of the counts in the TOTAL PIXEL COUNTER and the VISIBLE PIXEL COUNTER can be of assistance in this decision. That is, if the count in the VISIBLE PIXEL COUNTER is small in comparison to that in the TOTAL PIXEL COUNTER, then it may be desirable to programmatically ignore the image polygons in that bounding volume. On the other hand, if the counts are anywhere near equal, then it is probably wise to render those image polygons. The BVV mode is then turned back on at the start of the next bounding volume in the sorted list thereof, and so on.

5 Claims, 4 Drawing Sheets

Z BUFFER WITH DEGREE OF VISIBILITY TEST

REFERENCE TO RELATED PATENTS

The subject matter disclosed and claimed herein is related to that disclosed in pending U.S. patent application Ser. No. 08/690,433 filed on Jul. 26, 1996 by Dan Olsen, Noel Scott and Robert Casey and entitled SYSTEM AND METHOD FOR ACCELERATED OCCLUSION CULLING, and which is assigned to Hewlett-Packard Co. Pending application Ser. No. 08/690,433 is hereby incorporated herein by reference.

BACKGROUND OF THE INVENTION

A high performance 3-D graphics system has a frame buffer that includes both a color buffer for storing pixel intensity values for the different pixel addresses and a depth, or Z buffer for storing depth information for the same pixels. Pixel color and depth information arise from a rendering (or rasterization) process that converts small primitives, such as polygons identified by their vertices, into contiguous addressable locations corresponding to illumination positions (pixels) upon a graphics output device, such as a CRT. The overall image or scene is converted into a (typically large) collection of such polygons. The overall collection is generally composed of sub-collections, which may in turn have their own sub-collections. For example, an engineering view of an automobile under design may include collections that describe the body in relation to a frame, wheels, engine and other drive train elements, each having their own collections and sub-collections of polygons. The division into collections of polygons is managed by a graphics application program that executes on a host computer. The relationships between the polygons is defined and described in a data base. The host computer typically uses a graphics accelerator to assist in the processing of the polygons. As each polygon is processed it produces a collection of pixels that fills in the polygons defined by the vertices. To make a processed polygon visible, the resulting pixel values need to stored in the color buffer portion of the frame buffer.

When the user specifies a point of view relative to the object and a viewing volume to contain the object (as well as other things, such as lighting, too numerous to mention here) it becomes possible to process a list of polygons describing the object or scene and write the color values into the color buffer and their corresponding depth values into the Z buffer. However, just as we humans don't have X-ray vision, the color buffer needs to end up with only those pixels values that describe the selected view (projection of the desired slice of the object onto the viewing screen), and not any pixel values for locations within the object that are deeper along the viewing axis. This is where the Z buffer comes into use. It holds a depth value for each pixel value stored in the color buffer. A mode of Z buffer operation may be instituted that compares an incoming new Z value $Z_{new}$ against an existing already stored Z value $Z_{old}$. If the comparison is favorable, then the new pixel values for color and depth are allowed to overwrite the previous ones. In high performance systems this is usually done with hardware for speed reasons, although it can also be done in software.

A more thorough examination of Z buffering may be found in U.S. Pat. No. 4,961,153, entitled GRAPHICS FRAME BUFFER WITH STRIP Z BUFFERING AND PROGRAMMABLE Z BUFFER LOCATION, filed Aug. 18, 1987 and issued on Oct. 2, 1990.

Z buffering is all well and good, but it can consume a lot of time to transform all the polygon vertices and check all the pixels for the entire object or scene. This limits the rate at which new contents for the fame buffer can be computed, which limits the speed of such features as rotation, animation or other operations that are interactive. To speed things up it is now common to include the notion of bounding volumes in the data structure that describes the object. A bounding volume is an easy to render primitive, such as a cube, that is assumed to completely contain some subset of the collections and sub-collections of polygons. (A bounding volume may have a fair number of pixels on its surface, but in has far fewer vertices that need to be transformed, and that produces a significant savings in time.) In the case of the above mentioned automobile being designed, a bounding volume might enclose the entire engine. A different bounding volume could enclose the crankshaft within the engine, and a different one for the oil pump, etc. When it is time to compute new contents for the frame buffer, bounding volumes can be sorted along the viewing axis, from near to far (ambiguities can be resolved in any suitable way—randomly if need be). If the point of view is selected such that the hood of the car is visible from the top, then the engine and none of its internal components will be visible. The bounding volume containing the engine is, say a rectangular solid. If, as a test, we treat it as a primitive in its own right and ascertain that none of the pixel locations on its surfaces would be visible (because they are behind those of the hood), then there is no need to attempt any rendering of the polygons associated with any collections contained with the bounding volume for the engine. This allows the engine to be skipped, and so on. The savings in time can be considerable, and allows the completed image to be ready sooner. The general term for this topic is "occlusion culling" and it is the subject of the above mentioned patent application to Olsen, Scott and Casey that was incorporated herein by reference. Those interested in still more information about this topic may wish to consult a standard computer graphics text, such as *Fundamentals of Interactive Computer Graphics,* by James D. Foley and Andres Van Dam, published by Addison-Wesley Co. in July 1984 (2nd ed.). See all of Chapter 11 and §5 of Chapter 15.

As powerful as occlusion culling is, it is not the last performance enhancement possible in such graphics systems. It would be desirable if the technique of occlusion culling could be made more flexible by providing an indication of how much of a bounding volume is for sure not visible, and how much might contain visible polygons. It must be remembered that bounding volumes are chosen for their simple shape (small number of polygons), the better to be easy to render. Accordingly, they generally do not fit tightly over their contents. This means that the simple condition of a portion of a bounding volume being visible does not guarantee that any of its contents will be. All that can be said with certainty is that if none of the bounding volume is visible, then all of its contents can be ignored. But suppose that at most only ten or twenty pixels of a bounding volume will be visible, out of, say, several thousand, or perhaps several tens of thousands. It may be perfectly acceptable to the user to ignore that tiny amount as if it were truly not visible, and take the slight loss of detail as a penalty for increased speed of rendering. The penalty is only temporary, anyway, since when final accurate results are desired, a completely correct rendition can still be obtained. Thus, it would be desirable to allow the user to have such a mode of graphics operation, which we term "degree of visibility testing".

SUMMARY OF THE INVENTION

A solution to the problem of determining the degree of visibility for a bounding volume is to first sort the bounding volumes into an order in which they can be tested, after which they are rendered as if they were polygons in their own right. Prior to the testing of the next bounding volume a Bounding Volume Visibility (BVV) mode is enabled. This temporarily suspends write operations to the frame buffer (the bounding volume is not a real component of any image, after all) and it resets a TOTAL PIXEL COUNTER and a VISIBLE PIXEL COUNTER. Then the six (or how ever many) sides (primitive polygons described by their vertices) of the bounding volume are rendered, with each and every pixel of those polygons being checked for depth, as would be the pixels for "real" polygons. Each such pixel rendered causes an increment of the TOTAL PIXEL COUNTER, while each such pixel that meets the depth criteria in use causes an increment of the VISIBLE PIXEL COUNTER. The BVV mode is subsequently turned off, and the values of the two counters inspected. If the value in the VISIBLE PIXEL COUNTER is zero, then the associated bounding volume and its polygons collections can safely be ignored (skipped, not rendered), as none of those collections will ultimately be visible, even if rendered. If the VISIBLE PIXEL COUNTER is not zero, then it is possible, although not a certainty, that some pixels of the actual image polygons within the bounding volume would appear in the final rendition of the object or scene. The inspecting entity may be software associated with the graphics application. It can decide whether or not to render the image polygons within the bounding volume just tested. The values of the counts in the TOTAL PIXEL COUNTER and the VISIBLE PIXEL COUNTER can be of assistance in this decision. That is, if the count in the VISIBLE PIXEL COUNTER is small in comparison to that in the TOTAL PIXEL COUNTER, then it may be desirable to programmatically ignore the image polygons in that bounding volume. On the other hand, if the counts are anywhere near equal, then it is probably wise to render those image polygons (done with the BVV mode turned off, so that pixels can get written to the frame buffer). The counters may be implemented as actual hardware in a graphics accelerator, or as variables in a software mechanism responsive to the Z buffer comparison (which itself may be in either hardware or software, depending on the performance level of the graphics system at hand). The BVV mode is then turned back on at the start of the next bounding volume in the sorted list thereof, and so on.

DESCRIPTION OF A PREFERRED EMBODIMENT

Figure 1:
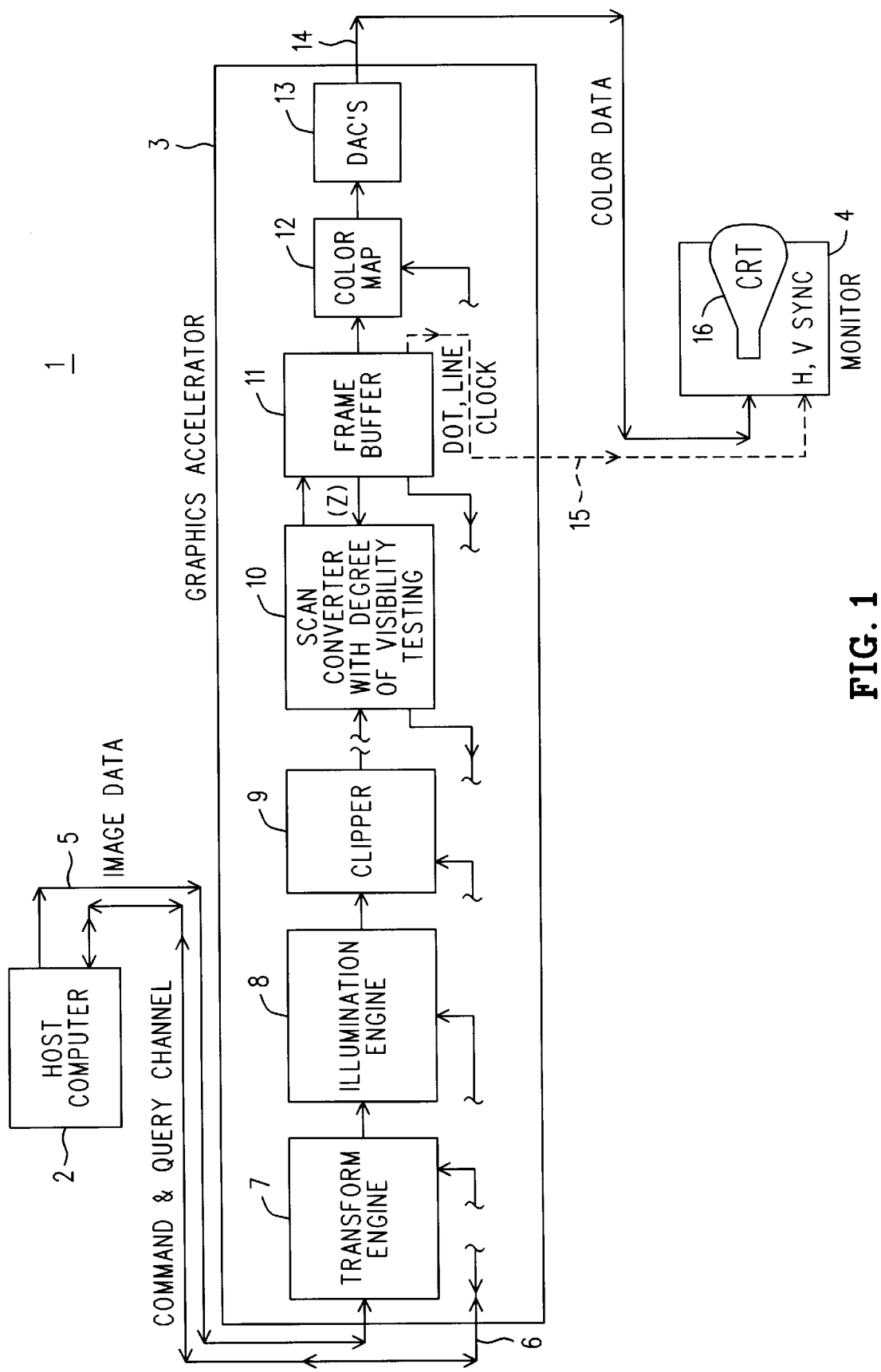
FIG. 1 is a simplified block diagram of a computer graphics system having a hardware graphics accelerator containing a hardware embodiment of the invention.

Refer now to FIG. 1, wherein is shown a simplified block diagram 1 of a high performance computer graphics system composed of a host computer 2 assisted by a hardware graphics accelerator 3, and whose output images are displayed upon a monitor 4 having a CRT 16 or other suitable graphics output device. The graphics accelerator 3 is connected to the host computer 2 by what is typically a high speed path 5 optimized to carry wide words from the host computer 2 to the graphics accelerator 3 at a very high transfer rate. The other path 6 is a low speed path, and may be bi-directional; it is intended to carry status information, commands and their parameters, and perhaps the answers to specific questions about register or frame buffer contents. Path 5 may be thought of as an image data channel for polygons as described by their vertices, and path 6 as a command and query channel. Anyhow, inside the graphics accelerator 3, which as hardware systems go, is usually pretty huge, there is what is commonly called a graphics pipeline that processes polygon vertex data. We have shown here only a portion of the functionality that might be in that pipeline, and indeed, much variation is possible here without affecting the operability of the invention in the least.

Typically the pipeline would include a transform engine 7 (sometimes called a geometry accelerator) whose function it is to perform various transformations upon the coordinates, not only to rotate and translate them, but also to go from one coordinate system to another. The output of the transform engine 7 is coupled to an illumination engine 8 whose task is to alter the color components according to the location and nature of assumed light sources. A clipper 9 restricts the image to portions that fit within a desired viewing volume. The transformed, illuminated and clipped polygons (still described only by their vertices) are then applied to a scan converter (rasterizer) 10, that in a preferred embodiment is also equipped with features that allow it to perform degree of visibility testing on polygons comprising bounding volumes. We shall talk more about that later, and at present will continue with a description of the graphics pipeline. The output of the scan converter is all the pixels (addresses, depth and color data) that are needed to actually display the filled polygon. These are applied to a frame buffer 11. Recall that the frame buffer comprises color buffer and a Z buffer portions, and note that the contents of the Z buffer are made available to the scan converter 10. The output of the frame buffer is applied to a color map 12, which in turn drives the DAC's 13 that produce the analog signals 14 sent to the monitor 4. The frame buffer 11 may also produce dot and line clock signals that may be used by the monitor as horizontal and vertical sync signals, respectively.

Generally speaking, most stuff in the graphics pipeline is coupled to the command and query channel 6, and is controlled by one or more massive state machines.

Figure 2:
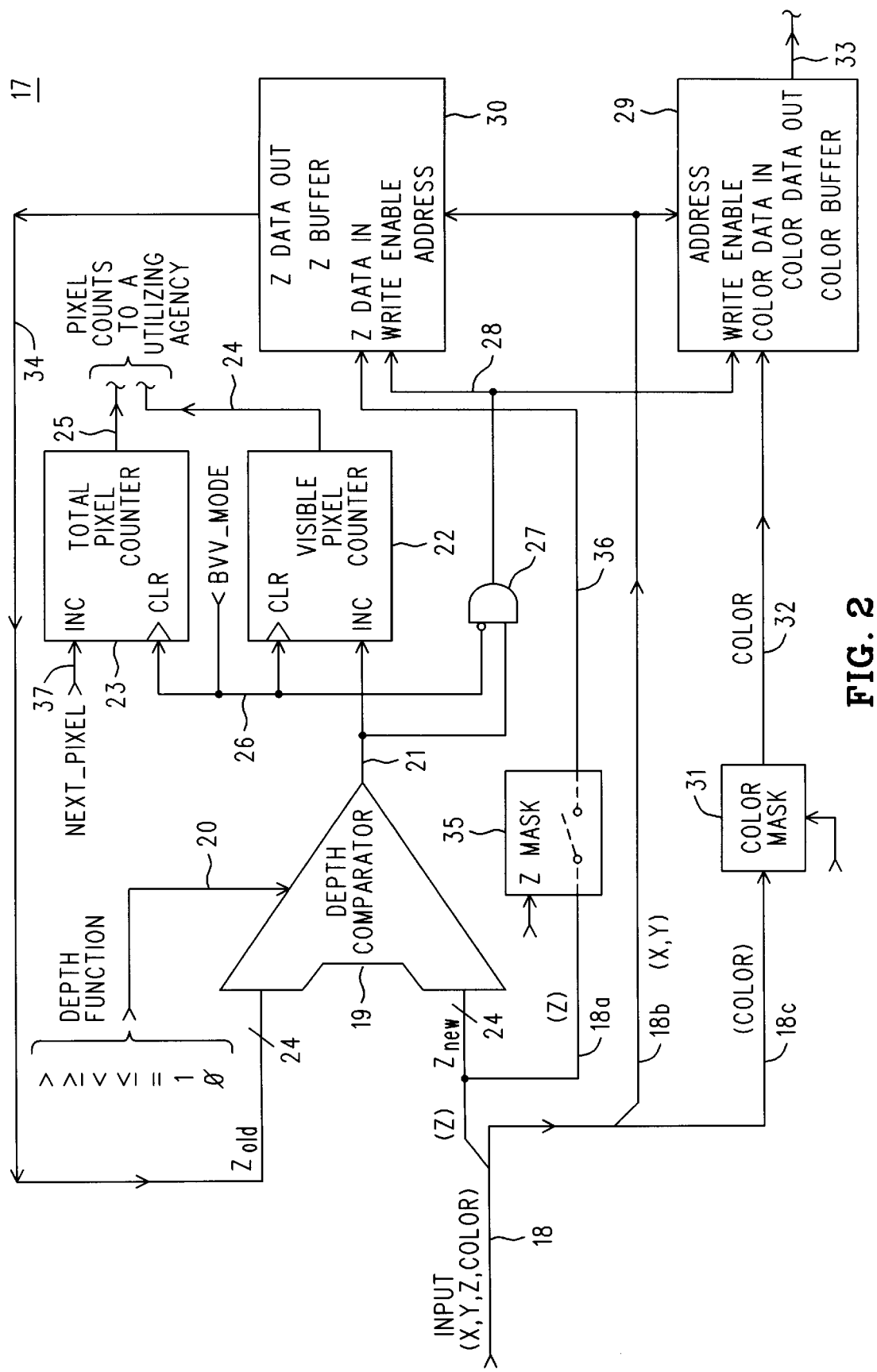
FIG. 2 is a more detailed but still simplified hardware block diagram of a Z buffer having a degree of visibility testing capability.

Refer now to FIG. 2, which is a more detailed yet still simplified partial block diagram of a portion of interest within the scan converter 10 of FIG. 1. Let us begin with the input 18, which carries X, Y, Z and color data. Z data 18a is separated out and applied to a Z mask circuit 35 and also as $Z_{new}$ to a depth comparator 19. Typically, the number of bits in $Z_{new}$ is pretty high, say twenty-four. The other input to the comparator 19 is an existing depth value for the pixel location (X, Y) for the present input 18, which value is obtained from the Z buffer 30 by addressing it with that X, Y location. To that end, the X and Y addresses are separated out as 18b, and applied as a combined XY address to both the Z buffer 30 and the color buffer 29.

The depth comparator decides if $Z_{new}$ is to be visible according to its value relative to $Z_{old}$ as specified by a depth function signal 20. Possible depth functions are the numerical relations greater than, greater than or equal to, less than, less than or equal to, equal to, as well as the non-numerical but still useful steady state conditions "always true" and "never true", denoted by the logic symbols 1 and 0, respectively.

The result 21 of the depth comparison is a "yes or no answer", and is applied to the increment input of a visible pixel counter 22 and to an AND gate 27. The other input of the AND gate 27 is arranged such that when the signal BVV_MODE 26 is false (the bounding volume visibility mode is not in effect) then a true output from the depth comparator 19 enables writing into the Z buffer of value 36 ($Z_{new}$ as operated upon by the "switch" in a software controlled Z mask circuit 35) and into the color buffer of the color data 32 (18c as operated upon by a software controlled color mask circuit 31). If the BVV mode is in effect, then such data for writing is not yet at hand, and no writes are allowed. Write operations to the color buffer 29 and Z buffer 30 portions of the frame buffer 11 are allowed and disallowed by controlling the write enable signals to those respective buffers with the output of AND gate 27. The color buffer 29 supplies a color data out signal 33 that is applied to the color map 12.

We turn now to the two counters, visible pixel counter 22 and total pixel counter 23. Each of these is reset to a value of zero each time the signal BVV_MODE goes true. This flushes any previous or erroneous value that may be in those counters at that time. Subsequently, the visible pixel counter increments each time the "answer" from the depth comparator 19 is "yes"; i.e., the condition imposed by the depth function 20 is met by $Z_{new}$ 18a in relation to $Z_{old}$ 34. The total pixel counter 23 is incremented each time there is a new pixel produced by the scan conversion process, as it operates on a polygon (which in this case will be one belonging to the bounding volume). The signal NEXT_PIXEL 37 represents such operation.

The scan conversion process can inform the controlling graphics application via the command and query channel 6 that a polygon is completed. Since that application set up the bounding volumes and initiated the BVV mode, it can count these and know when the entire bounding volume has been "rendered". It is at this point that the values in the counters 22 and 23 are of interest to that controlling graphics application. It then reads those values 24 and 25 from the visible pixel counter 22 and total pixel counter 23, respectively, by a suitable command and query channel I/O operation initiated by that application from within its execution environment in the host computer 2. It is up to that application program to decide what use to make of those values. That is, it can alter the display list of image polygons, or not, based on the values 24 and 25, in accordance with modes of operation selected by the user of the graphics system. Specifically, it can alter the display list of image polygons to include or exclude the image polygons contained within the bounding volume just checked.

Figure 3A:
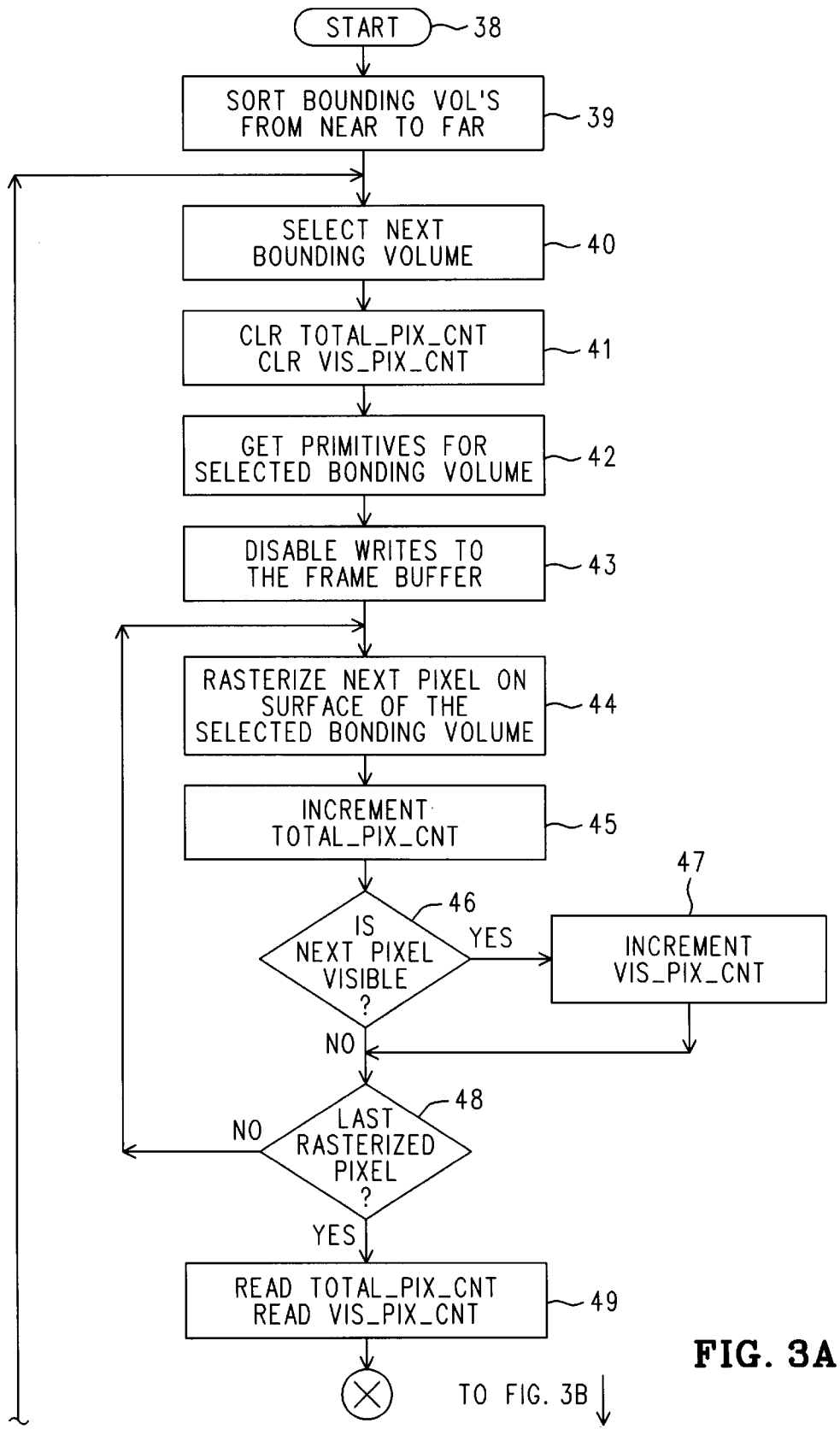
FIGS. 3A and 3B are a simplified flow chart of a method for practicing degree of visibility testing in a software environment.
Figure 3B:
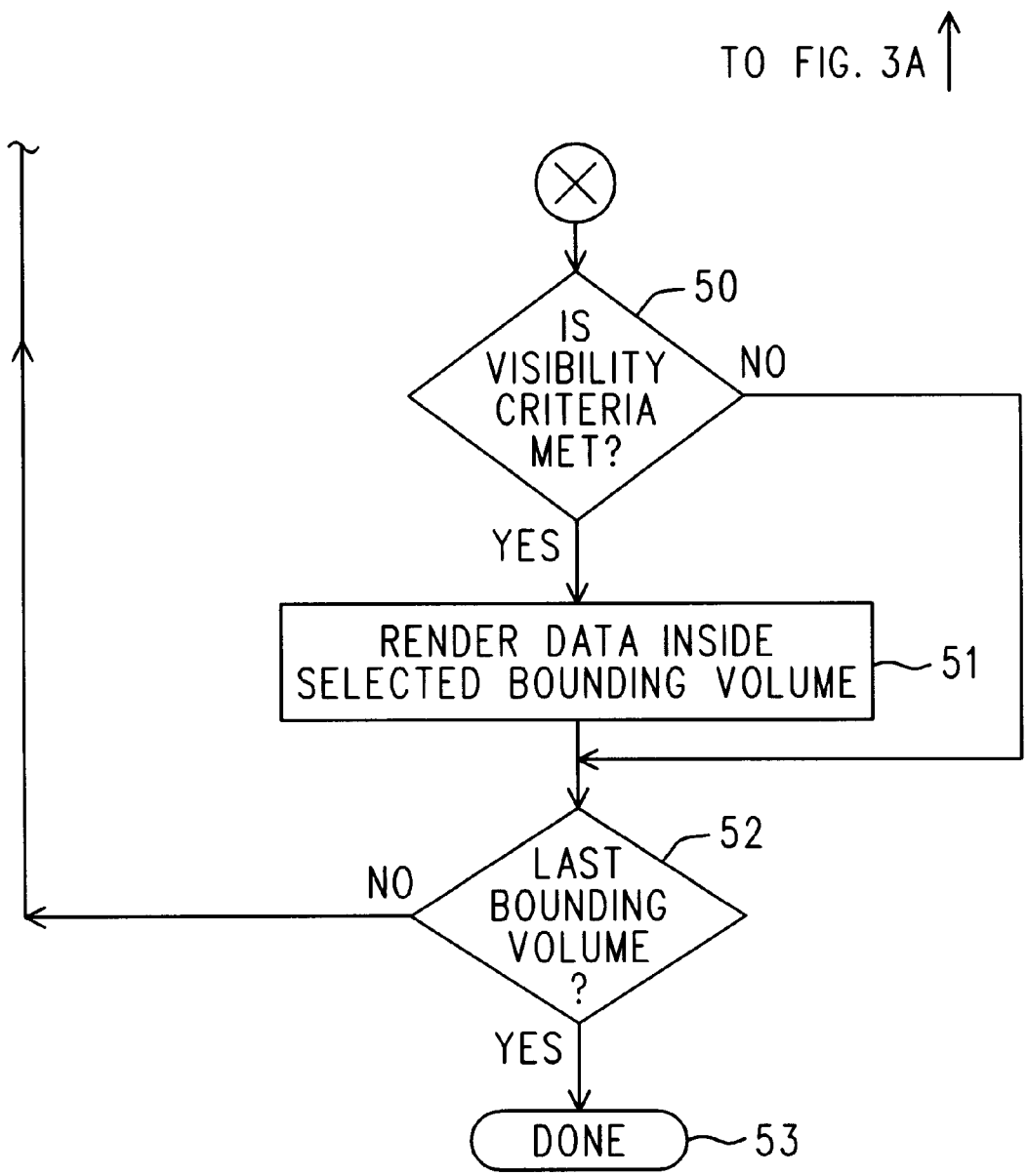

Refer now to FIGS. 3A and 3B, which are a simplified flowchart describing a method according to which a degree of visibility test may be performed upon the surface of a bounding volume that encloses a data image. The method assumes that bounding volumes have already been defined, and begins at the oval 38 denoted as START. From there the first step 39 in the method is to sort the bounding volumes into an appropriate order, e.g., from nearest to farthest relative to the viewpoint. It will be understood that even though the shape of the bounding volumes may make a strict ordering problematic (suppose that none of A, B and C contain any of the others, but that B and C are adjoining, and that as a unit are next to A and start and stop where A does. Such circumstances having no clear best choice can be resolved randomly, if need be, without reducing, on average, the performance increase afforded by the invention.)

Once the bounding volumes are sorted step 40 selects the next (which is initially the first) bounding volume in the sorted list thereof. Then in step 41 any previously accumulated counts are cleared. If the method is implemented in hardware, then the legend CLR TOTAL_PIX_CNT refers to clearing or resetting an actual register, such as total pixel counter 23 of FIG. 2. Likewise, in a software environment the legend CLR VIS_PIX_CNT would refer to assigning zero to a variable defined within the programming environment used to create the software. Either way, the next step 42 is to "get" (read the values for, or index pointers to) the primitives (collections of vertices describing polygons) for the bounding volume previously selected in step 40. Then at step 43 the ability to write to the frame buffer is disabled. The reason for doing this is to allow a hardware "scan conversion/pixel placement into the frame buffer" mechanism to operate as nearly normally as possible, but without there being any disturbance to the frame buffer contents. We seek the depth comparison, but do not want to put a would-be-visible but non-existent pixel on the surface of the bounding volume into the frame buffer. In a purely software environment an active disabling step 43 may be omitted in favor of simply never trying to store such a pixel anyway.

The next step 44 is to allow the scan conversion process to rasterize the next (which is initially the first) pixel on the surface of the selected bounding volume. It will be appreciated that the bounding volume is comprised of at least four polygons, and perhaps more. (For brevity, we have omitted a looping construct that steps through the individual primitives that comprise the bounding volume in favor of treating the bounding volume as if it were one unit surface that can be rasterized.) Following step 44, step 45 increments the count identified by the legend TOTAL_PIX_CNT. (The same remarks about hardware registers and variables as made in connection with step 41 apply here, too.)

Step 46 determines if the pixel in hand is visible. (Even though the legend says "next", don't be fooled. We named it "next" in step 44, and in step 46 it is the same pixel, and not the one after that.) If it is visible, then step 47 increments the count VIS_PIX_CNT. Either way, then the next step 48 asks if the last remaining pixel on the surface of the bounding volume has now been rasterized and checked for visibility. If not, then the method returns to step 44 to continue checking pixels on the surface of the bounding volume. If it has, then the counts TOTAL_PIX_CNT and VIS_PIX_CNT are made available to the agency that needs to know their values, so that step 50 can determine if the degree of visibility requirements are met, and thus conditionally allow step 51 to render the image data inside the selected bounding volume. In a hardware embodiment that agency is most likely the controlling graphics software, as accessed via the command and query channel 6, although one can envision programming the scan converter 10 to make the decision itself and report the result to a using agency. It will be appreciated that in order to do step 51 or not based on the result of step 50, a change is needed in what polygons in the display list are put into the graphics pipeline, and that level of control is outside the scope of the graphics pipeline itself. Anyhow, the last step 52 is to ask if the last bounding volume has been dealt with. If not, the method transitions back to step 40, and selects the next bounding volume with which to continue. Otherwise, the method is complete, as indicated by the DONE in oval 53.

It will be appreciated that the foregoing method may be practiced in hardware or in software, as described in the above remarks.

I claim:

1. A method of determining the degree of visibility of a bounding volume enclosing image data in a three dimensional graphics system, the method comprising the steps of:

c) comparing each Z depth value of a rendered bounding pixel of step b against an existing Z depth value already stored in a Z buffer at the address of the (X, Y) location for that rendered bounding pixel.

2. A method as in claim 1 further comprising the step of reading the values of the first and second counters with a program executing on a computer.

3. A method as in claim 2 further comprising the step of clearing the counters prior to performing step (b).

4. A graphics image processing apparatus comprising:

a Z buffer having a Z data input and a Z data output;

a scan converter receiving collections of bounding volume polygon vertices in a first mode and image polygon vertices in a second mode, and producing proposed new pixels that each include a pixel (X, Y) address, a Z value and pixel color values;

a depth comparator having a first input coupled to a new Z value associated with a proposed new pixel, having a second input coupled to the Z data output of the Z buffer and having an output indicative of the result of a comparison performed by the depth comparator;

a first counter having an increment input coupled to the output of the depth comparator;

a next pixel signal that transitions in a first manner each time the scan converter produces another proposed new pixel; and a second counter having an increment input coupled to the next pixel signal.

5. Apparatus as in claim 4 further comprising a mode signal that transitions in a first manner each time the first mode is established, the mode signal coupled to a clear input of the first counter and to a clear input of the second counter, the first and second counters being responsive to the transition in the first manner of the mode signal by resetting their content to zero.

* * * * *

UNITED STATES PATENT AND TRADEMARK OFFICE
CERTIFICATE OF CORRECTION

PATENT NO.    : 5,949,423                                           Page 1 of 1
DATED         : December 12, 2000
INVENTOR(S)   : Daniel M. Olsen It is certified that error appears in the above-identified patent and that said Letters Patent is hereby corrected as shown below:

<u>Column 7,</u>
Line 1, before "c)" add the following words:
-- a)   specifying a bounding volume enclosing image data:
   b)   rendering the surface of the bounding volume as a collection of bounding pixels, each of which has an (X,Y) location and a Z depth value; --
Line 4, delete "pixel," and insert therefor -- pixel; --
Line 4, after "pixel;" add the following words:
-- d) incrementing a first counter each time another bounding pixel is compared in step (c);
   e) incrementing a second counter each time the comparison of step (c) has a selected outcome; and
   f) determining whether or not to render as image pixels the image data enclosed by the bounding volume in accordance with the values of the first and second counters. --

Signed and Sealed this

Twenty-fourth Day of September, 2002

*Attest:*

*Attesting Officer*

JAMES E. ROGAN
*Director of the United States Patent and Trademark Office*